UNITED STATES PATENT OFFICE.

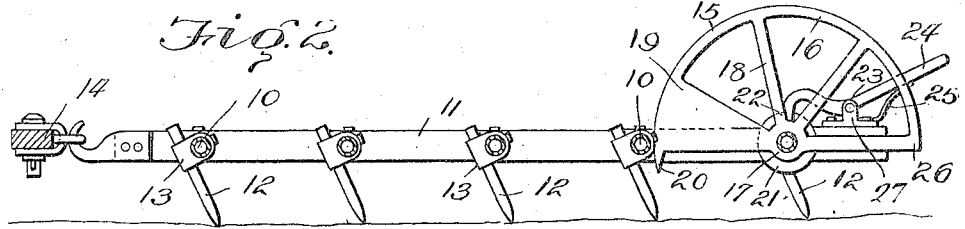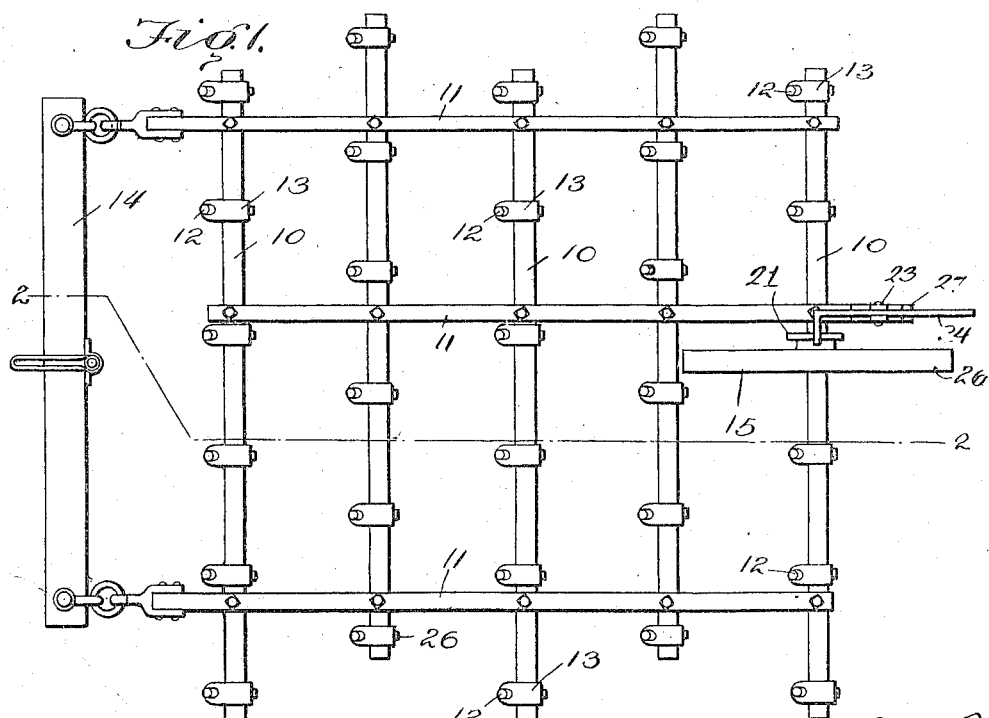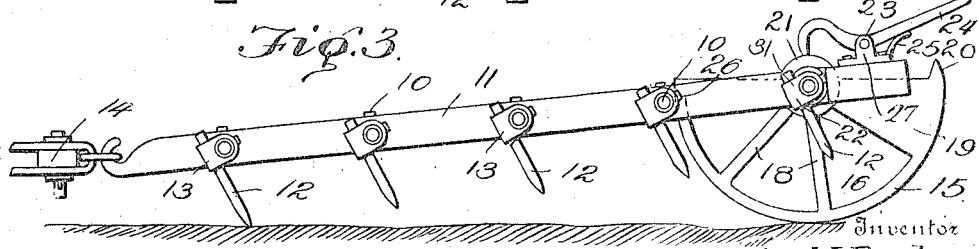

WALTER H. RUTH, OF GREENSBURG, KANSAS.

HARROW ATTACHMENT.

1,143,785.                    Specification of Letters Patent.    Patented June 22, 1915.

Application filed March 21, 1914.   Serial No. 826,314.

*To all whom it may concern:*

Be it known that I, WALTER H. RUTH, a citizen of the United States, residing at Greensburg, in the county of Kiowa and State of Kansas, have invented certain new and useful Improvements in Harrow Attachments, of which the following is a specification.

This invention relates to attachments for harrows and like implements and adapted to cause the harrow to be momentarily elevated at the rear end to relieve its teeth of the accumulations of corn hobs and other "trash".

Another object of the invention is to provide a simply constructed device which may be applied without material structural change to harrows of various forms and sizes.

With these and other objects in view the invention consists in certain novel features of construction as hereinafter shown and described and then specifically pointed out in the claims; and in the drawings illustrative of the preferred embodiment of the invention, Figure 1 is a plan view of a conventional harrow with the improvement applied. Fig. 2 is a side elevation in section on the line 2—2 of Fig. 1, the harrow in Figs. 1 and 2 being shown in operative position or in engagement with the ground. Fig. 3 is a view similar to Fig. 2 showing the harrow in elevated position.

Corresponding and like parts are referred to in the following description and indicated in all the views of the drawings by the same reference characters.

The improved device may be adapted without material structural change to harrows of various forms and sizes, and it is not desired therefore to limit the invention in this respect, but for the purpose of illustration is shown applied to a conventional harrow comprising a plurality of beams 10 coupled by longitudinal members 11, each beam being provided with a plurality of harrow teeth 12 coupled to the beams by clips 13 of the usual construction. The terminal coupling members 11 are united by an evener member 14 to which the draft animals are connected.

The improved device comprises a member adapted to be movably coupled to the harrow and operative by the forward movement of the harrow to elevate the rear end momentarily and thus permit accumulations of clods, corn hobs and other trash to escape. For the purpose of illustration the elevating member is in the form of a segment or half wheel represented as a whole at 15, mounted for rotation relative to the harrow, as for instance upon the rear beam 10. The member 15 may be of any suitable material and of any suitable size, but for the purpose of illustration is shown with a rim 16, hub 17 and connecting spokes 18. The member 15 is likewise formed of increased weight at one side, as indicated at 19, and preferably with a spur 20 at the weighted side, so that when released the member 15 will rotate automatically upon its center, as for instance upon the rear beam 10. Connected to the segmental member 15 is a disk 21 having a notch 22 in one side. Pivoted at 23 upon the harrow, preferably upon one of the connecting members 11, is a lever arm 24 adapted to engage in the notch 22 by its forward end, and maintained yieldably in position as by a spring 25. The member 15 will be located normally with its curved side upward as represented in Fig. 2, and to this end the notch 22 of the disk 21 is so located that the lever arm 24 will engage the notch when the member 15 is in the position shown in Fig. 2 and thus maintain the member in that position against the tendency of the weight 19 to move the segmental member upon its center. By this arrangement so long as the harrow is operating under normal conditions the segmental member will remain inactive, or in the position shown in Figs. 1 and 2. When the harrow becomes clogged by clods or other trash, as above noted, the operator forces the rear end of the lever 24 downwardly which elevates the forward end, detaches it from the notch 22 of the disk 21 and thus releases the weighted side of the member 15 which immediately rotates upon its center and causes the spur 20 to engage the ground, and as the harrow moves forwardly the member 15 serves as a lever to cause the rear end of the harrow to be elevated into the position shown in Fig. 3, the member 15 rolling upon the ground until the terminal 26 of the segmental member is located downwardly, and as the harrow continues to move forwardly the flat side of the segmental member will be moved into downward position and likewise move the weighted portion 11 into position in advance of its center, and thus cause the weighted portion to continue the rotation of the segmental member until the notch 22 is again in its upward position and will be automatically engaged by the shorter terminal of the member 24, thus automatically locking the member 15 in the position shown in Figs. 1 and 2. Thus to cause the operation of the device it is only necessary for the operator to press downwardly upon the rear end of the lever 24 and then release the lever and when the member 15 is rotated into its former position it will be automatically locked ready for the next action.

The improved device is simple in construction, can be readily adapted to harrows of different forms by slightly changing the form of the bracket 27 which contains the pivot 23, but such slight changes do not constitute a departure from the principle of the invention, as the same results would be produced no matter in what shape the harrow may be constructed.

Having thus described the invention, what is claimed as new is:

1. The combination with a harrow including a frame and toothed bars, of an elevating member having a segmental rim and a solid web at one side of the center to overbalance the elevating member, a spur extending from the elevating member and co-acting with the overbalancing web, and means for locking said elevating member in inoperative position relative to said frame and the toothed bars.

2. The combination with a harrow including a frame and toothed bars, of an elevating member having a segmental rim a hub and connecting spokes and a solid web at one side of the center to overbalance the elevating member, said hub being extended laterally and terminating in a notched flange, a spur extending from the elevating member and co-acting with the overbalancing web, and means co-acting with the notched flange for locking said elevating member in inoperative position relative to said frame and the toothed bars.

In testimony whereof I affix my signature in presence of two witnesses.

WALTER H. RUTH. [L. S.]

Witnesses:
W. S. GRANT,
C. H. FROST.